Patented Sept. 10, 1929.

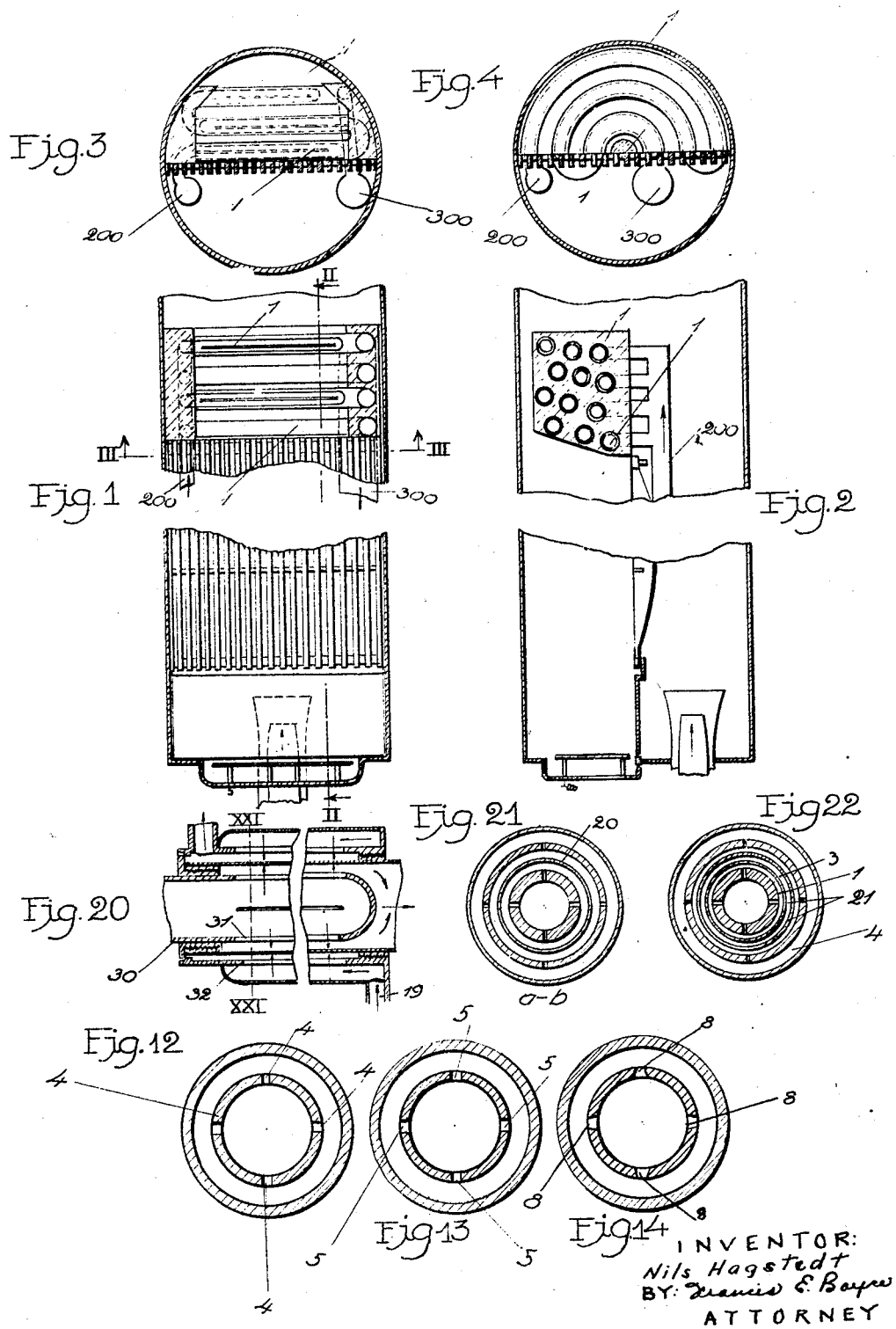

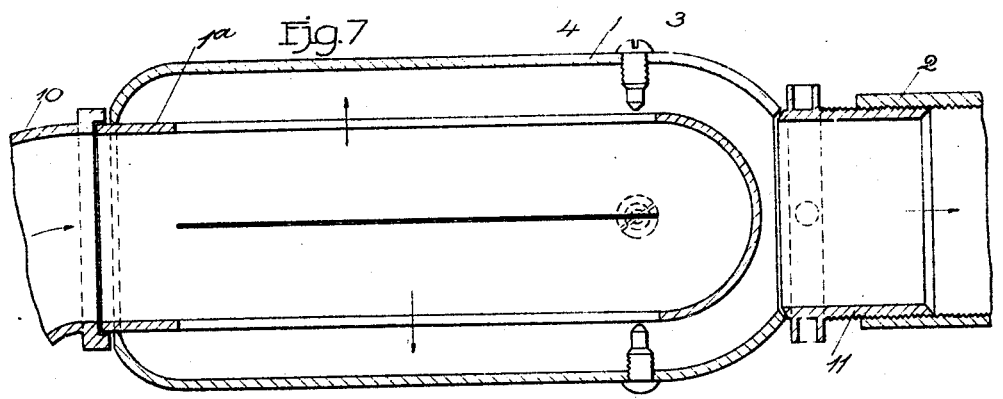
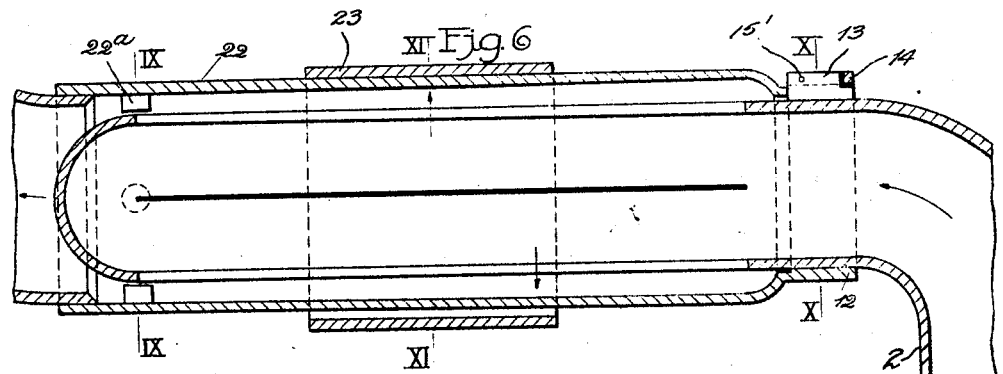
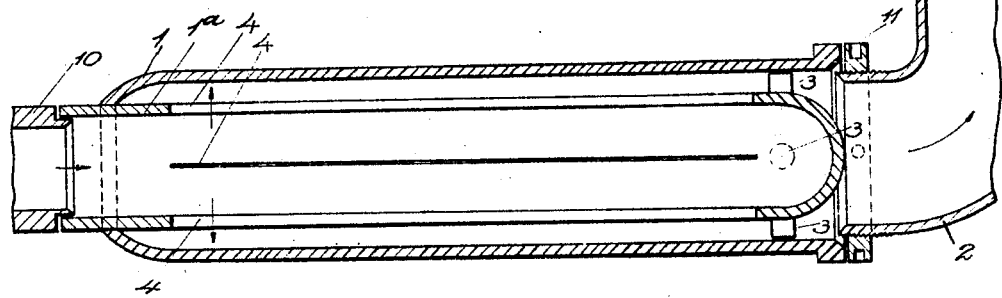
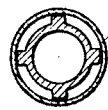   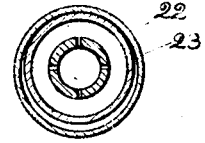
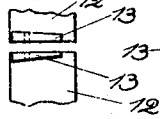 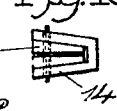 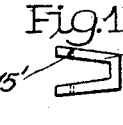 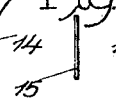 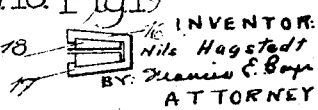

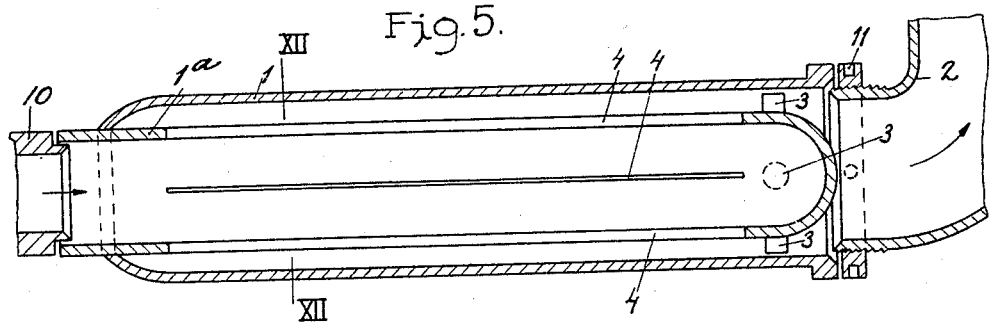
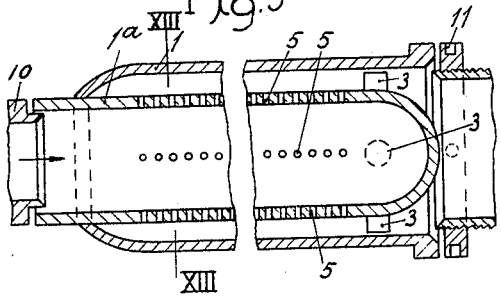 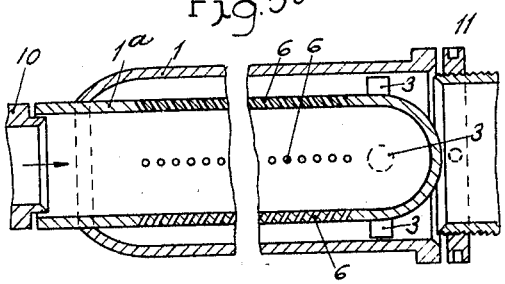
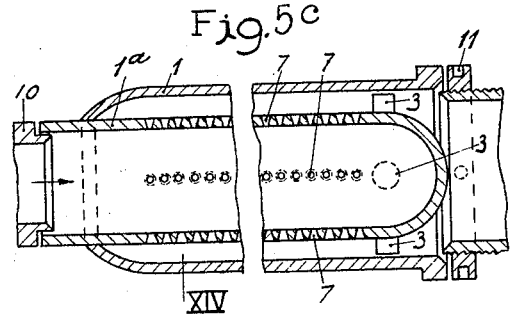 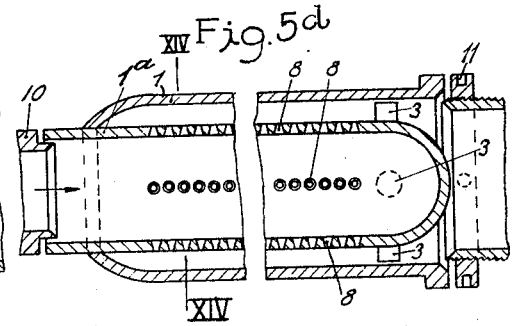
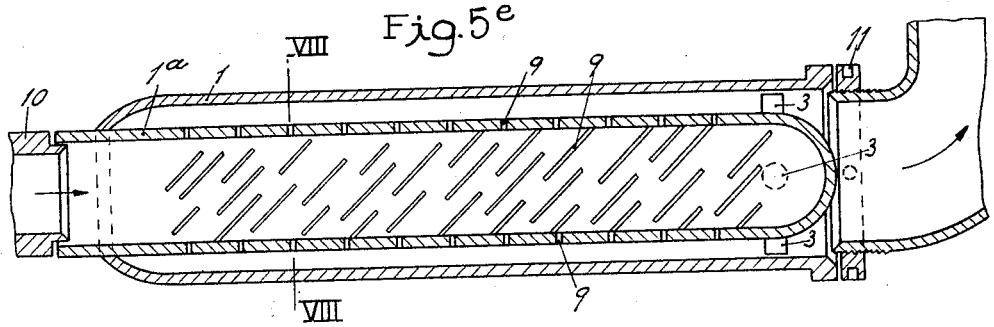

1,727,822

UNITED STATES PATENT OFFICE.

NILS HAGSTEDT, OF STOCKHOLM, SWEDEN.

DEVICE FOR HEATING OR COOLING FLUIDS.

Application filed December 3, 1924, Serial No. 753,575, and in Sweden November 22, 1923.

This invention relates to that class of heaters and coolers for liquid and gaseous fluids in which the medium to be treated passes through a system of piping, kept at the desired temperature; the object being to secure a highly efficient heat transmission, so that the highest possible difference of temperature is permanently maintained at the contact surfaces. For instance, when heating combustion air for steam boilers, this aim is achieved partly by locating the pipe system at the hottest part of the fire box, so that said pipe system forms a part of the fire bridge, and partly by means of an arrangement, which causes the cold air to be forced against the inside surface of the "heated" pipes at an angle with the heating surface, and in certain examples of my invention a right angle is preferred, although the angle may differ.

For a full understanding of the merits and advantages of the invention, reference is to be had to the accompanying drawings and to the following description, which embodies an example of the invention.

Figure 1 is a sectional plan view of a fire box fitted with the invention, Fig. 2 a longitudinal section of same on the line II—II of Fig. 1 and Fig. 3 a cross section on line III—III of Fig. 1. Fig. 4 is a cross section of the same fire box, showing a semi-circular arrangement of the piping, Fig. 5 a longitudinal section of a part of the piping. Figs. 5ª to 5ᵉ are views similar to Fig. 5, but each showing a different form of the apertures in the inner pipe. Figs. 6 and 7 show longitudinal sections of the piping, according to modified forms of the invention.

Fig. 8 is a cross sectional view taken on the line VIII—VIII of Fig. 5ᵉ, Figs. 9, 10 and 11 are cross sectional views taken respectively on the lines IX—IX, X—X and XI—XI of Fig. 6. Fig. 12 is a cross section on the line XII—XII, Fig. 5. Fig. 13 is a cross sectional view taken on line XIII—XIII of Fig. 5ª, Fig. 14 is a sectional view taken on line XIV—XIV, Fig. 5ᵈ. Fig. 15 is a plan view of the flanges shown in Fig. 10. Fig. 16 shows the complete arrangement for connecting said flanges and Figs. 17, 18 and 19 show details of said connecting arrangement. Fig. 20 shows a longitudinal section of a part of a modified form of the invention, Fig. 21 a cross section on line XXI—XXI, Fig. 20, and Fig. 22 a cross section of a modified form of the arrangement shown in Fig. 20.

As will be readily understood from Figs. 1, 2, 3 and 4, pipes 1 are arranged in the fire box so as to form a fire bridge. The cold air being admitted through the main inlet pipe 200 and branched off through pipes 1, is exhausted through the main outlet pipe 300. Pipes 1 may be connected in a series or in groups or in other ways. The pipes may be designed in two parts, as shown in Fig. 6, where 2 indicates a bent connecting pipe between two straight pipes 1.

The piping is made up of elements, each element having one straight pipe 1 enclosing an inside pipe 1ª, directly connected to an inlet pipe 10, the outer pipe 1 communicating with the bent pipe 2, leading into the straight pipe 1 of the next element, thus forming the outlet from one element and the inlet into the next. The inside pipe is supported by projections 3, resting against the inside wall of pipe 1.

The air to be heated is conducted from the inside pipe through longitudinal slots 4, and on account of the surplus pressure maintained in the inside pipe, said air will pass through the slots at a comparatively high velocity in a radial direction. Thus the volume of cold air will be thrown against the surface of the heated outside pipes at right angles, and the volume of air being considerable, there will prevail the highest possible difference of temperature between the heating surface and the air. Another advantage of this arrangement is that the circulation of air in the space between the pipes will be facilitated.

In lieu of slots 4 a series of circular apertures 5 may be used (Figs. 5ª and 13). Said apertures may have oblique direction, as shown at 6 in Fig. 5ᵇ, or may be made conical, widening outwardly as shown at 7 in Fig. 5ᶜ or inwardly as shown at 8 in Figs. 5ᵈ and 14. The slots may also be given the form of a screw line or a spiral as shown at 9 in Fig. 5e.

For connecting the different pipes, the following arrangements are designed:

As shown in Figs. 5 to 5e, the inside pipe 1a is fitted on an offset at the end of inlet pipe 10. The outside straight pipe 1 is connected to the bent pipe 2 by means of a ring 11, screwed on to the threaded end of pipe 2. Said connecting pipe 2 being rigidly fixed in the brick-work of the bridge, ring 11 may be screwed up against the end of pipe 1, thus forcing the pipes 1 and 1a to the left (Fig. 5) and forming a sufficiently tight fit between pipe 1a and pipe 10 as well as between pipe 1 and ring 11.

Another connecting device is shown in Fig. 6. The inside pipe constituting a direct continuation of connecting pipe 2, is supported by means of projections 22a extending from the inside of pipe 22. The end of said pipe 22, shown to the right in Fig. 6, embraces connecting pipe 2 by means of an axially slotted part 12. This part 12 is provided with two projections 13, one at each side of the slot and both tapered as shown in Fig. 15. A shaped strap 14 is forced on the flanges, said strap being retained by means of a cotterpin 15, forced through holes 15' in the strap and the flanges. Fig. 19 embodies another device for connecting the tapered flanges. According to this arrangement the connection is secured by means of a spring strap 16, at the open end provided with projections 17 on the inside. The strap being forced to fit the tapered sides of the flanges, said projections will prevent the strap from sliding back.

In the modified form shown in Fig. 20, a liquid or gaseous fluid of high temperature is let in through the inside pipe 30 with the object of heating a similar fluid, let in through pipe 19. Both fluids pass through longitudinal slots 31, 32 and are forced up against the walls of pipe 20 through which the heat is transmitted.

In Fig. 22 there are two transmitting pipes, as shown at 21. In this case a fluid to be cooled may be let into the space between pipes 21, the cooling medium circulating around said pipes.

According to the arrangement shown in Fig. 6, pipe 22 is surrounded by a fire proof tube 23 in order to protect pipe 22 from being burnt by the hot flames.

In using the heat transmitting devices described above, certain important advantages are gained. With devices now generally in use the fluid to be treated will pass along the heat transmitting surface, only exposing a part of the fluid to the surface, the other parts being kept out of contact with the surface. The difference of temperature between the surface and the particles of fluid will decrease, in the same degree lessening the efficiency of the heat transmission, said efficiency, essentially depending on the difference of temperature. This invention makes it possible to maintain the temperature difference at a high value, thus upholding the efficiency of the process.

Having now described the invention, what I claim is—

1. A device for heating and cooling liquid and gaseous fluids comprising a plurality of fluid conducting pipes arranged in concentric spaced relation, one of said pipes having a solid wall throughout, and others of said pipes having apertures in the walls thereof for intercommunication on opposite sides of said solid walled pipe.

2. A device for heating and cooling liquid and gaseous fluids comprising a plurality of fluid conducting pipes arranged in concentric spaced relation, the walls of alternate pipes being apertured for intercommunication.

In testimony whereof I have signed my name to this specification.

NILS HAGSTEDT.